US011396450B2

(12) United States Patent
Weiss et al.

(10) Patent No.: US 11,396,450 B2
(45) Date of Patent: Jul. 26, 2022

(54) REFORMING USING SULFUR-TOLERANT REFORMING CATALYST

(71) Applicant: ExxonMobil Technology and Engineering Company, Annandale, NJ (US)

(72) Inventors: Brian M. Weiss, Bridgewater, NJ (US); Tilman W. Beutel, Neshanic Station, NJ (US); Herbert W. Barry, Yardville, NJ (US); Gerardo J. Majano Sanchez, Basking Ridge, NJ (US); John F. Brody, Bound Brook, NJ (US); Walter Weissman, Basking Ridge, NJ (US); Kanmi Mao, Clinton, NJ (US)

(73) Assignee: ExxonMobil Technology and Engineering Company, Annandale, NJ (US)

(*) Notice: Subject to any disclaimer, the term of this patent is extended or adjusted under 35 U.S.C. 154(b) by 469 days.

(21) Appl. No.: 16/295,052

(22) Filed: Mar. 7, 2019

(65) Prior Publication Data

US 2019/0300364 A1 Oct. 3, 2019

Related U.S. Application Data

(60) Provisional application No. 62/648,556, filed on Mar. 27, 2018.

(51) Int. Cl.
| | | |
|---|---|---|
| *C01B 3/26* | (2006.01) | |
| *B01J 21/12* | (2006.01) | |
| *B01J 23/42* | (2006.01) | |
| *B01J 23/46* | (2006.01) | |
| *B01J 21/04* | (2006.01) | |

(Continued)

(52) U.S. Cl.
CPC ............... *C01B 3/26* (2013.01); *B01J 21/04* (2013.01); *B01J 21/12* (2013.01); *B01J 23/42* (2013.01);

(Continued)

(58) Field of Classification Search
CPC .... C01B 3/26; B01J 21/12; B01J 23/42; B01J 23/464

(Continued)

(56) References Cited

U.S. PATENT DOCUMENTS

| | | | |
|---|---|---|---|
| 6,397,790 B1 * | 6/2002 | Collier, Jr. .......... | F02D 19/0644 123/3 |
| 7,067,453 B1 * | 6/2006 | Ming ...................... | B01J 23/40 423/652 |

(Continued)

FOREIGN PATENT DOCUMENTS

| | | |
|---|---|---|
| WO | 201589254 A1 | 6/2015 |
| WO | 201589256 A1 | 6/2015 |
| WO | 201589257 A1 | 6/2015 |

OTHER PUBLICATIONS

Study of gamma-alumina Surface Reactivity: Adsorption of Water and Hydrogen Sulfide on Octahedral Aluminum Sites. Andrei Ionescu et al J. Phys. Chem. B, V 106, pp. 9359-9366 (Year: 2002).*

(Continued)

*Primary Examiner* — Douglas B Call
(74) *Attorney, Agent, or Firm* — Liza Negron

(57) ABSTRACT

Sulfur-tolerant reforming catalysts that include bulk alumina in the catalyst support are provided. The sulfur-tolerant reforming catalysts can include a sulfur-tolerant catalytic metal to facilitate reforming. The catalyst can further include a support material that includes at least some alumina as bulk alumina and/or octahedrally coordinated alumina. The sulfur-tolerant reforming catalysts can be regenerated, such as periodically regenerated, under relatively mild conditions that allow the catalysts to maintain reforming activity in the presence of 1 vppm to 1000 vppm of sulfur in the feed for reforming.

20 Claims, 5 Drawing Sheets

(51) Int. Cl.
  *C01B 3/40* (2006.01)
  *F02B 43/00* (2006.01)
  *B01J 35/00* (2006.01)
  *B01J 23/58* (2006.01)
  *B01J 23/40* (2006.01)

(52) U.S. Cl.
  CPC ............ *B01J 23/464* (2013.01); *B01J 23/58* (2013.01); *B01J 35/002* (2013.01); *C01B 3/40* (2013.01); *F02B 43/00* (2013.01); *B01J 23/40* (2013.01); *C01B 2203/0227* (2013.01); *C01B 2203/0233* (2013.01); *C01B 2203/0238* (2013.01); *C01B 2203/061* (2013.01); *C01B 2203/062* (2013.01); *C01B 2203/107* (2013.01); *C01B 2203/1047* (2013.01); *C01B 2203/1064* (2013.01); *C01B 2203/1082* (2013.01); *C01B 2203/1241* (2013.01)

(58) Field of Classification Search
  USPC ........................................................ 252/373
  See application file for complete search history.

(56) References Cited

U.S. PATENT DOCUMENTS

| | | | |
|---|---|---|---|
| 7,491,250 B2 | 2/2009 | Hershkowitz et al. | |
| 7,815,873 B2 | 10/2010 | Sankaranarayanan et al. | |
| 7,901,565 B2 | 3/2011 | Giroux et al. | |
| 7,901,566 B2 | 3/2011 | Giroux et al. | |
| 7,914,933 B2 | 3/2011 | Bolton et al. | |
| 8,539,914 B2 | 9/2013 | Kerns et al. | |
| 2004/0033885 A1 | 2/2004 | Wang et al. | |
| 2010/0104897 A1* | 4/2010 | Bae .................... | H01M 8/0618 429/425 |
| 2015/0166913 A1 | 6/2015 | Brody et al. | |
| 2017/0051708 A1 | 2/2017 | Weiss et al. | |
| 2017/0137285 A1 | 5/2017 | Ide et al. | |

OTHER PUBLICATIONS

Complete oxidation of methane at low temperature over noble metal based catalysts: a review Patrick Gelin and Michel Primet Applied Catalysis B: Environmental V 39, pp. 1-37 (Year: 2002).*

The International Search Report and Written Opinion of PCT/US2019/021071 dated Jun. 18, 2019.

Shinagawa et al., "Effects of Hydrogen Addition to SI Engine on Knock Behavior," SAE Technical Paper 2004-01-1851, 2004.

Gomes et al., "Thermodynamic and experimental studies of catalytic reforming of exhause gas recirculation in gasoline engines", App. Cat. B: Environmental, 102, 2011, 44-53.

Shinagawa et al., "Feasibility Study of Onboard Hydrogenation System in Gasoline Engine", Review of Automotive Engineering, 28, 2007, 211-217.

* cited by examiner

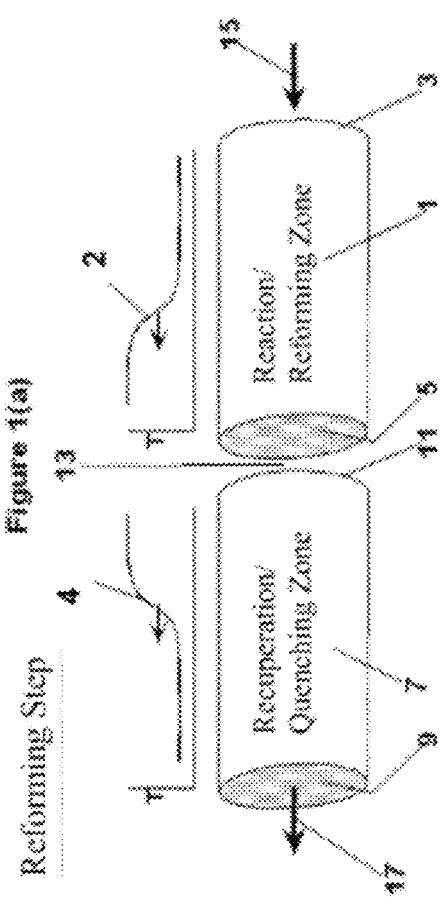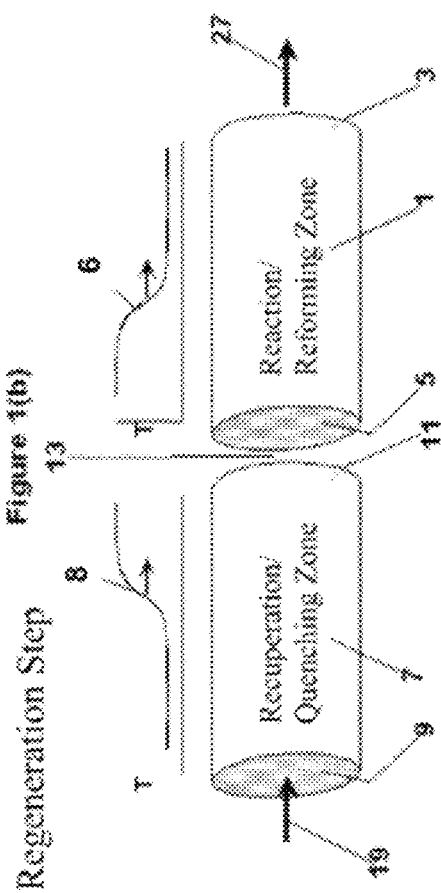

REFORMING USING SULFUR-TOLERANT REFORMING CATALYST

CROSS-REFERENCE TO RELATED APPLICATIONS

This application claims the benefit of U.S. Provisional Application No. 62/648,556, filed on Mar. 7, 2018, the entire contents of which are incorporated herein by reference.

FIELD

This invention relates to a reforming catalyst that is tolerant of low levels of sulfur contamination in a feed for processing, and corresponding systems and methods for reforming in the presence of the reforming catalyst.

BACKGROUND

Increasing amounts of available petroleum feedstocks correspond to natural gas sources or other methane-containing sources. The increased availability of methane and/or small hydrocarbon petroleum sources can potentially have increased value if efficient methods can be identified for conversion to larger compounds.

One option for converting methane (and other small hydrocarbons) to other compounds is to reform the methane to form $H_2$ and/or CO (i.e., synthesis gas). Both steam reforming and dry reforming are known, but each type of reforming poses a variety of challenges. Some of the challenges can be related to the low tolerance of conventional reforming catalysts for sulfur contamination. For conventional reforming catalysts, even part-per-million amounts of sulfur in a reforming feed can quickly result in deactivation of the reforming activity of a reforming catalyst. Unfortunately, for many applications, performing sufficient sulfur removal on a feed to reduce the sulfur content to 0.1 vppm or less can be cost prohibitive. In order to overcome this deficiency, reforming catalysts that can avoid deactivation in the presence of part-per-million amounts of sulfur and/or that can be effectively regenerated after exposure to part-per-million amounts of sulfur are desirable.

In some environments, such as automotive engine environments, reforming of small hydrocarbons can also be beneficial for modifying the combustion properties of a fuel. Traditional engine fuels are typically processed for sulfur removal, but current specifications typically specify sulfur contents of up to 10 wppm for liquid fuels, such as gasoline or diesel, or sulfur contents up to 15 vppm for gaseous fuels, such as natural gas. As a result, conventional fuels can quickly poison a reforming catalyst, leading to loss of reforming activity. Thus, a reforming catalyst that can be effectively regenerated in an engine environment after exposure to part-per-million amounts of sulfur is also desirable for on-board reforming.

U.S. Pat. Nos. 7,901,565 and 7,901,566 describe sulfur-tolerant reforming catalysts that do not include alumina and/or that do not include bulk, unreacted, or free alumina. The sulfur-tolerant catalysts are described as being non-sulfating.

U.S. Patent Application Publications 2015/0166913 and 2017/0051708 describe vehicle powertrains that include on-board catalytic reforming. Various metal oxides, zeolitic materials, and mixtures thereof are described as potential support materials for a reforming catalyst. A specific mixture of metal oxides that is described as a catalyst support material is a mixture of aluminum oxide, lanthanum oxide, cerium oxide, and zirconium oxide.

U.S. Pat. No. 7,815,873 describes methods for reforming of a hydrocarbon fuel in a reverse flow reactor configuration. The reactor is described as being suitable for performing pressure swing reforming, such as a pressure swing reforming process as described in U.S. Pat. No. 7,491,250.

SUMMARY

In various aspects, a method for reforming a hydrocarbon-containing stream is provided. The method includes exposing a hydrocarbon-containing stream comprising 0.1 vppm of more of sulfur to a catalyst in the presence of at least one of $H_2O$ and $CO_2$ under reforming conditions to form a reformed product comprising $H_2$. The catalyst can include 0.1 wt % to 10.0 wt % of a Group VIII metal, such as Rh, Pt, Pd, or a combination thereof, on a sulfur-tolerant support comprising bulk alumina. The catalyst is then exposed to a stream comprising 0.1 vol % or more of $O_2$ at a regeneration temperature for a regeneration time period. Optionally, the exposure of the catalyst to the stream containing $O_2$ under the regeneration conditions can be performed periodically. The molar ratio of $O_2$ delivered during the regeneration time period to sulfur exposed to the catalyst during the prior reforming time period can be, for example, 20 or more.

In some aspects, the sulfur-tolerant support can include 1.0 wt % to 80 wt % alumina and/or can include alumina with octahedral coordination. Optionally, the sulfur-tolerant support can also include at least one of silica, titania, and zirconia. In some aspects, the Group VIII metal can correspond to Rh, Pd, Pt, or a combination thereof. Optionally, the catalyst can further include a Group 11 metal. In some aspects, the catalyst can correspond to a first catalytic metal and a second catalytic metal. In such aspects, the first catalytic metal can correspond to Rh, Ni, or a combination thereof, while the second catalytic metal can correspond to Pt, Pd, or a combination thereof. In such aspects, a weight ratio of the first catalytic metal to the second catalytic metal can be 0.1 to 10.

In some aspects, the hydrocarbon-containing stream is exposed to the catalyst in a reverse flow reactor. In such aspects, the hydrocarbon-containing stream can include 5.0 wt % or more $C_{2+}$ hydrocarbons and/or 40 wt % or more methane. In other aspects, the hydrocarbon-containing stream can correspond to a fuel for a spark ignition engine. In such aspects, exposing the hydrocarbon-containing stream to the catalyst can further include exposing a recycle portion of an exhaust gas from combustion of at least a portion of the reformed product to the catalyst.

In various aspects, a reformer including a reforming catalyst as described above is also provided. Optionally, the reformer can correspond to a reformer in a reverse flow reforming reactor. Optionally, the reformer can correspond to an on-board reformer in fluid communication with a spark ignition engine. In such an aspect, the reformer can further include a reformer inlet in fluid communication with an engine exhaust and a reformer outlet in fluid communication with an engine fuel input.

BRIEF DESCRIPTION OF THE DRAWINGS

FIG. 1 schematically shows an example of operation of a reverse flow reactor.

DETAILED DESCRIPTION OF THE EMBODIMENTS

Figure 2:
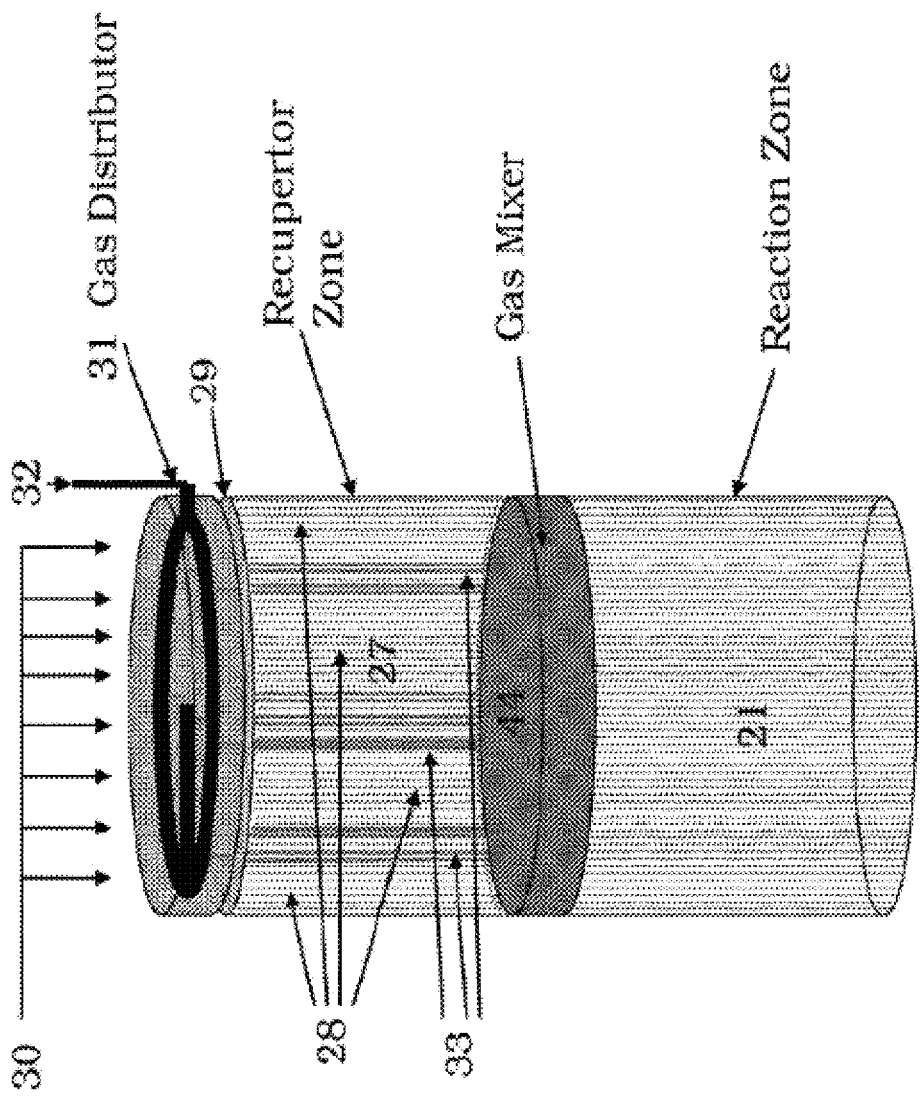
FIG. 2 schematically shows an example of a reverse flow reactor.

All numerical values within the detailed description and the claims herein are modified by "about" or "approximately" the indicated value, and take into account experimental error and variations that would be expected by a person having ordinary skill in the art.

Overview

In various aspects, sulfur-tolerant reforming catalysts that include bulk alumina in the catalyst support are provided. The sulfur-tolerant reforming catalysts can include a sulfur-tolerant catalytic metal to facilitate reforming, such as Ni, Pt, Pd, Rh, or a combination thereof. More generally, the sulfur-tolerant catalytic metal can include one or more Group VIII metals (Fe, Co, Ni, Pt, Pd, Rh, Ir, Ru, Os), optionally one or more Group VIII noble metals (Pt, Pd, Rh, Ir, Ru, Os), and optionally can further include one or more Group IB metals (Cu, Ag, Au). The catalyst can further include a support material that includes at least some alumina as bulk alumina and/or octahedrally coordinated alumina. Additionally or alternately, the catalyst support can include non-crystalline alumina. The sulfur-tolerant reforming catalysts can periodically regenerated under relatively mild conditions that allow the catalysts to maintain reforming activity in the presence of 0.1 vppm to 100 vppm of sulfur in the feed for reforming, or 0.1 vppm to 15 vppm, or 0.1 vppm to 10 vppm. In some aspects, the catalyst can be suitable for production of syngas (a gas containing $H_2$ and $CO/CO_2$ in some ratio) from natural gas or other hydrocarbon-containing feeds. The syngas can then be used, for example, for the production of methanol, dimethyl ether, hydrocarbon fuels, lube basestocks, and/or as a source of hydrogen.

U.S. Pat. No. 7,901,566 describes sulfur-tolerant catalysts that include catalyst supports that contain at least one of silica, zirconia, and titania. Additionally, the catalyst supports are described as not containing "unreacted or free" alumina. Such bulk alumina is described as being susceptible to formation of alumina sulfates. Zeolite materials are described as examples of alumina-containing supports that do not include unreacted or free alumina. One skilled in the art would understand that alumina present in a zeolite is characterized by tetrahedral coordination, as evidenced by nuclear magnetic resonance (NMR) spectroscopy (e.g., $^{27}$Al-NMR). Alumina that is not in a zeolite is characterized by octahedral coordination, as also evidenced by NMR spectroscopy. Therefore, alumina with octahedral coordination is known in the art as "unreacted or free".

It has been unexpectedly discovered that reforming catalysts including unreacted (or free or bulk) alumina in the catalyst support can be used as sulfur-tolerant catalysts. Without being limited by any particular theory, such a catalyst with bulk alumina may be rendered sulfur-tolerant so long as the surface of the unreacted or free alumina is interacting with a second element, such as silica, titania, or zirconia. The unreacted or free alumina may be protected from the detrimental formation of aluminum sulfates by the interaction of the second element with the surface alumina. This is in contrast to having, for example, a relatively uniform distribution of the second element throughout the catalyst support, so that every bulk alumina species is interacting with the second element.

During reforming, a feed can be exposed to the reforming catalyst under reforming conditions. In various aspects, the feed can include 0.1 vppm to 50 vppm of sulfur, or 0.1 vppm to 20 vppm, or 0.1 vppm to 15 vppm, or 0.1 vppm to 10 vppm. In order to reduce or minimize accumulation of sulfur that could result in a reduction in reforming activity, the reforming catalyst can be periodically exposed to regeneration conditions. The regeneration conditions can correspond to exposing the reforming catalyst to a gas including oxygen and one or more diluent gases at a temperature of from 200° C. to 700° C., or 300° C. to 600° C. The oxygen can correspond to 0.1 vol % to 10 vol % of the flow of gas exposed to the reforming catalyst during the regeneration conditions. The one or more diluent gases can correspond to the balance of the gas flow. Any convenient regeneration time period can be used, from 1 second to 24 hours, depending on the amount of sulfur present in the feed for reforming and the amount of feed exposed to the reforming catalyst since the prior regeneration. In some aspects, the amount of oxygen in the gas flow during regeneration can be selected to provide a desired ratio of oxygen provided during the regeneration time period relative to sulfur exposed to the catalyst during the prior reforming time period. For example, the molar ratio of $O_2$ delivered during the regeneration time period to sulfur exposed to the catalyst during the prior reforming time period can be 20 or more, or 30 or more, or 40 or more, such as up to 200 or possibly still higher.

In some aspects, a catalyst support for a sulfur-tolerant catalyst can include 10 wt % to 80 wt % of alumina, or 20 wt % to 80 wt %, or 10 wt % to 50 wt %, or 20 wt % to 50 wt %. Additionally or alternately, a catalyst support for a sulfur-tolerant catalyst can include sufficient alumina that a bulk alumina phase can be assigned in an X-ray diffraction spectra of the support. Examples of bulk alumina phases that can be detected based on X-ray diffraction include, but are not limited to, gamma-alumina and alpha-alumina. A gamma-alumina phase can be identified in an X-ray diffraction spectra based on a peak with at least twice the intensity of the baseline signal at a value of 2-theta between 45 and 48 degrees with Cu—K-alpha radiation as the X-Ray source.

In some aspects, a catalyst support containing bulk alumina that has a sufficient amount of a second element to avoid formation of sulfates can correspond to a catalyst with 1.0 mol % to 80 mol % of the second element relative to the sum of the total moles of aluminum and the second element in the catalyst. In some cases, if the support has low surface area, such as below 50 m$^2$/g, then less of the second element is needed to interact with the surface alumina, for example 1.0 mol % to 20 mol % of the second element. In some cases, such as for supports having a surface area greater than 100 m$^2$/g, a higher content of the second metal can be beneficial, such as 20 mol % to 80 mol %.

Sulfur-Tolerant Reforming Catalyst with Support Containing Bulk Alumina

In various aspects, methane (or other hydrocarbon) reforming can be performed in the presence of a sulfur-tolerant reforming catalyst that includes a catalyst support containing bulk alumina and/or octahedrally-coordinated alumina. A sulfur-tolerant reforming catalyst can provide various advantages. For example, a sulfur-tolerant reforming catalyst can allow for reforming of hydrocarbon feeds containing levels of sulfur that are more readily achieved by hydrotreating, adsorption, and/or other methods for reducing the content of sulfur in a hydrocarbon feed. Additionally or alternately, the conditions for regeneration of a sulfur-tolerant catalyst can be relatively mild, which can allow the sulfur-tolerant reforming catalyst to be used in a variety of processing environments.

Suitable catalyst support materials for the catalyst can include support materials that a) include bulk alumina and/or octahedrally-coordinated alumina and b) that have sufficient second element at the surface to avoid sulfate formation on the surface of the catalyst support. This can correspond to support materials with 20-80 moles % of the second element or 1-20 moles % of the second element on the surface of the catalyst support. Examples of suitable materials for the catalyst support can include supports containing a mixture of metal oxides, such as supports including alumina and one or more of silica, zirconia, titania. Other combinations of metal oxides can also potentially be suitable, so long as bulk alumina is present and the surface has a sufficient amount of a second element at the surface.

The material used in the catalyst support can have any convenient surface area that would normally be suitable for use in a catalyst support, such as a surface area of 50 m$^2$/g to 500 m$^2$/g or possibly more. The support material and/or the oxides used to form the support material can be processed for use as a support, such as a support having a particle size between 0.01 microns and 10 mm. Optionally, the catalyst support can be steamed and/or calcined prior to adding catalytic metals to the catalyst. For example the catalyst support can be steamed at a temperature of 500° C. to 900° C. for 1 hour to 48 hours prior to addition of metals to the catalyst.

Catalytic metals can then be added to the catalyst in any convenient manner, such as by incipient wetness impregnation. Examples of suitable metals can include, but are not limited to, Group VIII metals (Fe, Ru, Os, Co, Rh, Ir, Ni, Pd, Pt), Group IB metals (Cu, Au, and Ag), as well as combinations thereof. Preferably, the metals can be Rh, Pt, Pd, or a combination thereof. Both Group VIII noble metals and Group VIII non-noble metals may potentially be suitable, depending on the application for the catalyst. For applications where the catalyst is used at temperatures below 800° C., any Group VIII or Group IB metal may be suitable. At higher temperatures, some Group VIII metals or metal oxides and/or Group IB metals or metal oxides can become volatile and/or can tend to sinter or agglomerate. For higher temperature applications, the catalytic metal can be Rh, Ni, Co, Pd, Pt, and/or combinations thereof. Rh can be advantageous in some aspects due to a reduced tendency to sinter or agglomerate. Pd and Co can tend to have lower activities. Ni has an intermediate activity but may also lead to increased coke formation when $C_{2+}$ hydrocarbons are present in the feed. However, in combination with a suitable regeneration process and/or when a feed has a reduced or minimized content of $C_{2+}$ hydrocarbons, Ni can also be suitable.

The amount of catalytic metal on the catalyst support can be characterized based on the weight of the metal itself, as opposed to an oxide or other compound containing the catalytic metal. The amount of catalytic metal on the support can be 0.1 wt % to 10.0 wt %, or 1.0 wt % to 10.0 wt %, or 0.1 wt % to 5.0 wt %, or 0.5 wt % to 5.0 wt %, or 1.0 wt % to 5.0 wt %. In some aspects, the catalytic metal can correspond to a combination of metals. In some aspects when two or more metals are present, each metal can separately be present in an amount as described above. Additionally or alternately, in some aspects when two or more metals are present, the combined amount of catalytic metals can correspond to an amount as described above.

In some aspects where two or more metals are present, a first catalytic metal can correspond to Rh or Ni and a second catalytic metal can correspond to Pt or Pd. In such aspects, a weight ratio of the first catalytic metal (or combined amount of first catalytic metals) to the second catalytic metal (or combined amount of second catalytic metals) can be from 0.1 to 10, or 1.0 to 10, or 2.0 to 10, or 0.1 to 5.0, or 1.0 to 5.0, or 2.0 to 5.0. It is noted that a weight ratio of 1.0 corresponds to having equal weights of the first catalytic metal and the second catalytic metal.

One option for impregnating a catalyst support with a catalytic metal can be to impregnate via incipient wetness with an aqueous solution of suitable metal salt or other catalytic metal precursor, such as tetramineplatinum nitrate or rhodium nitrate hydrate. The impregnated support can then be dried and/or calcined for decomposition of the catalytic metal precursor. A variety of temperature profiles can potentially be used for the heating steps. One or more initial drying steps can be used for drying the support, such as heating at a temperature from 100° C. to 200° C. for 0.5 hours to 24 hours. A calcination to decompose the catalytic metal precursor compound can be at a temperature of 200° C. to 800° C. for 0.5 hours to 24 hours, depending on the nature of the impregnated catalytic metal compound. Depending on the precursor for the catalytic metal, the drying step(s) and/or the decomposing calcination step(s) can be optional.

The catalyst (including support and catalytic metal) can then be used in any convenient manner. In some aspects, the catalyst can be used as part of a bed of catalyst particles. In other aspects, the catalyst can be coated on a structure, such as a monolith structure that can reside within a reactor. To form a washcoat solution, the catalyst can optionally be combined with a binder, such as an alumina binder. The mixture of catalyst and binder can then be added to water to form an aqueous suspension having 10 wt % to 50 wt % solids. For example, the aqueous suspension can include 10 wt % to 50 wt % solids, or 15 wt % to 40 wt %, or 10 wt % to 30 wt %. The amount of binder relative to the amount of solids can be any convenient amount, and the amount of binder can vary depending on the porosity and/or roughness. It is noted that smaller particles may adhere to the monolith surface better in the initial layer, so addition of a binder can assist with providing smaller particle sizes in a mixture of catalyst and binder particles. Optionally, an acid can be added to the aqueous solution to reduce the pH so as to reduce or minimize agglomeration of the alumina catalyst and/or binder particles. For example, acetic acid or another organic acid can be added to achieve a pH of 3 to 4. The suspension can then be ball milled (or processed in another manner) to achieve a desired particle size for the catalyst particles, such as a particle size of 0.5 μm to 5 μm. After milling, the solution can be stirred until time for use so that the particles are distributed substantially uniformly in the solution.

The washcoat solution can then be applied to a monolith structure to achieve a desired amount of catalyst (such as rhodium) on the monolith surface. As an example, in one aspect a washcoat thickness of 10 microns was achieved by forming a washcoat corresponding to 10 wt % of the monolith structure. Any convenient type of monolith structure can be used to provide a substantial surface area for support of the catalyst particles. For example, an alumina monolith with 100 to 2000 cells per square inch can be used, where the cells traverse the length of the monolith. It is believed that this type of alumina monolith can be protected by the presence of the second element in the catalyst coating. The washcoat can be applied to the monolith to form cells having inner surfaces coated with the catalyst. One option for applying the washcoat can be to dip or otherwise submerge the monolith in the washcoat. After clearing the cell channels of excess washcoat, the monolith can be dried and/or calcined. Drying can correspond to heating at 100° C. to 200° C. for 0.5 hours to 24 hours, while calcining can correspond to heating at 200° C. to 800° C. for 0.5 hours to 24 hours.

The monolith can be composed of a material that is suitable for use at the temperatures of the reaction environment. For example, stainless steel has a relatively low melting point, and is not suitable for use with reaction environments having a temperature of greater than 1000° C. or 1200° C. Cordierite similarly has a melting point that may be too low for various applications. A relatively high volumetric heat capacity can also be beneficial so that the structure can retain heat during processing. In addition to alumina, other suitable materials can include zirconia, yttria, and/or silicon carbide.

An example of a monolith can be an extruded honeycomb monoliths. Honeycomb monoliths can be extruded structures that comprise many (e.g., a plurality, meaning more than one) small gas flow passages or conduits, arranged in parallel fashion with thin walls in between. A small reactor may include a single monolith, while a larger reactor can include a number of monoliths, while a still larger reactor may be substantially filled with an arrangement of many honeycomb monoliths. Each monolith may be formed by extruding monolith blocks with shaped (e.g., square or hexagonal) cross-section and two- or three-dimensionally stacking such blocks above, behind, and beside each other. Monoliths can be attractive as reactor contents because they provide high heat transfer capacity with minimum pressure drop.

In some aspects, honeycomb monoliths can be characterized as having open frontal area (or geometric void volume) between 40% and 80%, and having conduit density between 50 and 2000 pores per square inch, or between 100 and 1000 pores per square inch. For example, in one embodiment, the conduits may have a diameter/characteristic cell side length of only a few millimeters, such as on the order of roughly one millimeter. Reactor media components, such as the monoliths or alternative bed media, can provide for channels that include a packing with an average wetted surface area per unit volume that ranges from 50 ft$^1$ to 3000 ft$^1$ (~0.16 km$^{-1}$ to ~10 km$^{-1}$), or from 100 ft$^{-1}$ to 2500 ft$^{-1}$ (~0.32 km$^{-1}$ to ~8.2 km$^{-1}$), or from 200 ft$^{-1}$ to 2000 ft$^{-1}$ (~0.65 km$^{-1}$ to ~6.5 km$^{-1}$), based upon the volume of the first reactor that is used to convey a reactant. These relatively high surface area per unit volume values can aid in achieving a relatively quick change in the temperature through the reactor, such as generally illustrated by the relatively steep slopes in the exemplary temperature gradient profile graphs shown in FIG. 1(a) or 1(b) of FIG. 1.

Reactor media components can also provide for channels that include a packing that includes a high volumetric heat transfer coefficient (e.g., 0.02 cal/cm$^3$s° C. or more, or 0.05 cal/cm$^3$s° C. or more, or 0.10 cal/cal/cm$^3$s° C. or more); that have low resistance to flow (low pressure drop); that have an operating temperature range consistent with the highest temperatures encountered during regeneration; that have high resistance to thermal shock; and/or that have high bulk heat capacity (e.g., 0.10 cal/cm$^3$s° C. or more, or 0.20 cal/cm$^3$s° C. or more). As with the high surface area values, these relatively high volumetric heat transfer coefficient values and/or other properties can aid in achieving a relatively quick change in the temperature through the reactor, such as generally illustrated by the relatively steep slopes in the exemplary temperature gradient profile graphs, such as in FIGS. 1(a) and 1(b) of FIG. 1. The cited values are averages based upon the volume of reactor used for conveyance of a reactant.

In various aspects, adequate heat transfer rate can be characterized by a heat transfer parameter, $\Delta$THT, below 500° C., or below 100° C., or below 50° C. The parameter $\Delta$THT, as used herein, is the ratio of the bed-average volumetric heat transfer rate that is needed for recuperation, to the volumetric heat transfer coefficient of the bed, hv. The volumetric heat transfer rate (e.g. cal/cm$^3$ sec) that is sufficient for recuperation can be calculated as the product of the gas flow rate (e.g. g/sec) with the gas heat capacity (e.g. cal/g° C.) and desired end-to-end temperature change (excluding any reaction, e.g. ° C.), and then this quantity can be divided by the volume (e.g. cm$^3$) of the reactor (or portion of a reactor) traversed by the gas. The volumetric heat transfer coefficient of the bed, hv, can typically be calculated as the product of an area-based coefficient (e.g. cal/cm$^2$s° C.) and a specific surface area for heat transfer (av, e.g. cm$^2$/cm$^3$), often referred to as the wetted area of the packing.

Reforming and Regeneration Conditions—Reverse Flow Reforming Reactor

A sulfur-tolerant reforming catalyst as described herein can be suitable for reforming of hydrocarbons under steam reforming conditions in the presence of H$_2$O, under dry reforming conditions in the presence of CO$_2$, or under conditions where both H$_2$O and CO$_2$ are present in the reaction environment. As a general overview of operation during reforming in a swing reactor, such as a reverse flow reactor, a regeneration step or portion of a reaction cycle can be used to provide heat for the reactor. Reforming can then occur within the reactor during a reforming step or portion of the cycle, with the reforming reaction consuming heat provided during the reactor regeneration step. During reactor regeneration, fuel and an oxidant are introduced into the reactor from a regeneration end of the reactor. The bed and/or monoliths in the regeneration portion of the reactor can absorb heat, but typically do not include a catalyst for reforming. As the fuel and oxidant pass through the regeneration section, heat is transferred from the regeneration section to the fuel and oxidant. Combustion does not occur immediately, but instead the location of combustion is controlled to occur in a middle portion of the reactor. The flow of the reactants continues during the regeneration step, leading to additional transfer of the heat generated from combustion into the reforming end of the reactor.

After a sufficient period of time, the combustion reaction is stopped. Any remaining combustion products and/or reactants can optionally be purged. The reforming step or portion of the reaction cycle can then start. The reactants for reforming can be introduced into the reforming end of the reactor, and thus flow in effectively the opposite direction relative to the flow during regeneration. The bed and/or monoliths in the reforming portion of the reactor can include a catalyst for reforming. As reforming occurs, the heat introduced into the reforming zone during combustion can be consumed by the endothermic reforming reaction. After exiting the reforming zone, the reforming products (and unreacted reactants) are no longer exposed to a reforming catalyst. As the reforming products pass through the regeneration zone, heat can be transferred from the products to the regeneration zone. After a sufficient period of time, the reforming process can be stopped, remaining reforming products can optionally be collected or purged from the reactor, and the cycle can start again with a regeneration step.

FIG. 1 shows examples of the temperature profile within a reverse flow reactor during a reforming/regeneration cycle. In FIG. 1(a), the reforming portion of the cycle is shown. As reforming occurs, the temperature in the reforming zone is decreased, which can cause the temperature profile to appear to shift toward the middle of the reactor. The highest temperatures are present near the middle of the reactor, which is where the actual combustion reaction takes place during the regeneration portion of the cycle.

The reforming reaction performed within the reactor can correspond reforming of methane and/or other hydrocarbons using steam reforming, in the presence of $H_2O$; using dry reforming, in the presence of $CO_2$, or using "bi" reforming in the presence of both $H_2O$ and $CO_2$. Examples of stoichiometry for steam, dry, and "bi" reforming of methane are shown in equations (1)-(3).

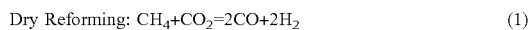

Dry Reforming: $CH_4+CO_2=2CO+2H_2$ (1)

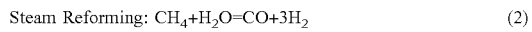

Steam Reforming: $CH_4+H_2O=CO+3H_2$ (2)

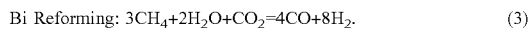

Bi Reforming: $3CH_4+2H_2O+CO_2=4CO+8H_2$. (3)

As shown in equations (1)-(3), dry reforming can produce lower ratios of $H_2$ to CO than steam reforming. Reforming reactions performed with only steam can generally produce a ratio of $H_2$ to CO of around 3, such as 2.5 to 3.5. By contrast, reforming reactions performed in the presence of $CO_2$ can generate much lower ratios, possibly approaching a ratio of $H_2$ to CO of roughly 1.0 or even lower. By using a combination of $CO_2$ and $H_2O$ during reforming, the reforming reaction can potentially be controlled to generate a wide variety of $H_2$ to CO ratios in a resulting syngas.

It is noted that the ratio of $H_2$ to CO in a synthesis gas can also be dependent on the water gas shift equilibrium. Although the above stoichiometry shows ratios of roughly 1 or roughly 3 for dry reforming and steam reforming, respectively, the equilibrium amounts of $H_2$ and CO in a synthesis gas can be different from the reaction stoichiometry. The equilibrium amounts can be determined based on the water gas shift equilibrium, which relates the concentrations of $H_2$, CO, $CO_2$ and $H_2O$ based on the reaction

$H_2O+CO<=>H_2+CO_2$ (4)

Most reforming catalysts, such as rhodium and/or nickel, can also serve as water gas shift catalysts. Thus, if reaction environment for producing $H_2$ and CO also includes $H_2O$ and/or $CO_2$, the initial stoichiometry from the reforming reaction may be altered based on the water gas shift equilibrium. This equilibrium is also temperature dependent, with higher temperatures favoring production of CO and $H_2O$. It is noted that higher temperatures can also improve the rate for reaching equilibrium. As a result, the ability to perform a reforming reaction at elevated temperatures can potentially provide several benefits. For example, instead of performing steam reforming in an environment with excess $H_2O$, $CO_2$ can be added to the reaction environment. This can allow for both a reduction in the ratio of $H_2$ to CO produced based on the dry reforming stoichiometry as well as a reduction in the ratio of $H_2$ to CO produced based on the water gas shift equilibrium. Alternatively, if a higher $H_2$ to CO ratio is desired, $CO_2$ can be removed from the environment, and the ratio of $H_2O$ to $CH_4$ (or other hydrocarbons) can be controlled to produce a desirable type of synthesis gas. This can potentially allow for generation of a synthesis gas having a $H_2$ to CO ratio of 0.1 to 15, or 0.1 to 3.0, or 0.5 to 5.0, or 1.0 to 10, by selecting appropriate amounts of feed components.

The reforming reactions shown in equations (1)-(3) are endothermic reactions. One of the challenges in commercial scale reforming can be providing the heat for performing the reforming reaction in an efficient manner while reducing or minimizing introduction of additional components into the desired synthesis gas product. Cyclic reaction systems, such as reverse flow reactor systems, can provide heat in a desirable manner by having a cycle including a reforming step and a regeneration step. During the regeneration step, combustion can be performed within a selected area of the reactor. A gas flow during regeneration can assist with transferring this heat from the combustion zone toward additional portions of the reforming zone in the reactor. The reforming step within the cycle can be a separate step, so that incorporation of products from combustion into the reactants and/or products from reforming can be reduced or minimized. The reforming step can consume heat, which can reduce the temperature of the reforming zone. As the products from reforming pass through the reactor, the reforming products can pass through a second zone that lacks a reforming or water gas shift catalyst. This can allow the reaction products to cool prior to exiting the reactor. The heat transferred from the reforming products to the reactor can then be used to increase the temperature of the reactants for the next combustion or regeneration step.

One common source for methane is natural gas. In some applications, natural gas, including associated hydrocarbon and impurity gases, may be used as a feed for the reforming reaction. The supplied natural gas also may be sweetened and/or dehydrated natural gas. Natural gas commonly includes various concentrations of associated gases, such as ethane and other alkanes, preferably in lesser concentrations than methane. The supplied natural gas may include impurities, such as $H_2S$ and nitrogen. More generally, the hydrocarbon feed for reforming can include any convenient combination of methane and/or other hydrocarbons. Optionally, the reforming feed may also include some hydrocarbonaceous compounds, such as alcohols or mercaptans, which are similar to hydrocarbons but include one or more heteroatoms different from carbon and hydrogen.

In some aspects, the feed for reforming can include, relative to a total weight of hydrocarbons in the feed for reforming, 5 wt % or more of $C_{2+}$ compounds, such as ethane or propane, or 10 wt % or more, or 15 wt % or more, or 20 wt % or more, such as up to 50 wt % or possibly still higher. It is noted that nitrogen and/or other gases that are non-reactive in a combustion environment, such as $H_2O$ and $CO_2$, may also be present in the feed for reforming. In aspects where the reformer corresponds to an on-board reforming environment, such non-reactive products can optionally be introduced into the feed, for example, based on recycle of an exhaust gas into the reformer. Additionally or alternately, the feed for reforming can include 40 wt % or more methane, or 60 wt % or more, or 80 wt % or more, or 95 wt % or more, such as having a feed that is substantially composed of methane (98 wt % or more). In aspects where the reforming corresponds to steam reforming, a molar ratio of steam molecules to carbon atoms in the feed can be 0.3 to 4.0. It is noted that methane has 1 carbon atom per molecule while ethane has 2 carbon atoms per molecule. In aspects where the reforming corresponds to dry reforming, a molar ratio of $CO_2$ molecules to carbon atoms in the feed can be 0.05 to 3.0.

Within the reforming zone of a reverse flow reactor, the temperature can vary across the zone due to the nature of how heat is added to the reactor and/or due to the kinetics of the reforming reaction. The highest temperature portion of the zone can typically be found near a middle portion of the reactor. This middle portion can be referred to as a mixing zone where combustion is initiated during regeneration. At least a portion of the mixing zone can correspond to part of the reforming zone if a monolith with reforming catalyst extends into the mixing zone. As a result, the location where combustion is started during regeneration can typically be near to the end of the reforming zone within the reactor. Moving from the center of the reactor to the ends of the reactor, the temperature can decrease. As a result, the temperature at the beginning of the reforming zone (at the end of the reactor) can be cooler than the temperature at the end of the reforming zone (in the middle portion of the reactor).

As the reforming reaction occurs, the temperature within the reforming zone can be reduced. The rate of reduction in temperature can be related to the kinetic factors of the amount of available hydrocarbons for reforming and/or the temperature at a given location within the reforming zone. As the reforming feed moves through the reforming zone, the reactants in the feed can be consumed, which can reduce the amount of reforming that occurs at downstream locations. However, the increase in the temperature of the reforming zone as the reactants move across the reforming zone can lead to an increased reaction rate.

At roughly 500° C., the reaction rate for reforming can be sufficiently reduced that little or no additional reforming will occur. As a result, in some aspects as the reforming reaction progresses, the beginning portion of the reforming zone can cool sufficiently to effectively stop the reforming reaction within a portion of the reforming zone. This can move the location within the reactor where reforming begins to a location that is further downstream relative to the beginning of the reforming zone. When a sufficient portion of the reforming zone has a temperature below 500° C., or below 600° C., the reforming step within the reaction cycle can be stopped to allow for regeneration. Alternatively, based on the amount of heat introduced into the reactor during regeneration, the reforming portion of the reaction cycle can be stopped based on an amount of reaction time, so that the amount of heat consumed during reforming (plus heat lost to the environment) is roughly in balance with the amount of heat added during regeneration. After the reforming process is stopped, any remaining synthesis gas product still in the reactor can optionally be recovered prior to starting the regeneration step of the reaction cycle.

The regeneration process can then be initiated. During regeneration, a fuel such as methane, natural gas, or $H_2$, and oxygen can be introduced into the reactor and combusted. The location where the fuel and oxidant are allowed to mix can be controlled in any convenient manner, such as by introducing the fuel and oxidant via separate channels. By delaying combustion during regeneration until the reactants reach a central portion of the reactor, the non-reforming end of the reactor can be maintained at a cooler temperature. This can also result in a temperature peak in a middle portion of the reactor. The temperature peak can be located within a portion of the reactor that also includes the reforming catalyst. During a regeneration cycle, the temperature within the reforming reactor can be increased sufficiently to allow for the reforming during the reforming portion of the cycle. This can result in a peak temperature within the reactor of 1100° C. or more, or 1200° C. or more, or 1300° C. or more, or potentially a still higher temperature.

The relative length of time and reactant flow rates for the reforming and regeneration portions of the process cycle can be selected to balance the heat provided during regeneration with the heat consumed during reforming. For example, one option can be to select a reforming step that has a similar length to the regeneration step. Based on the flow rate of hydrocarbons, $H_2O$, and/or $CO_2$ during the reforming step, an endothermic heat demand for the reforming reaction can be determined. This heat demand can then be used to calculate a flow rate for combustion reactants during the regeneration step. Of course, in other aspects the balance of heat between reforming and regeneration can be determined in other manners, such as by determining desired flow rates for the reactants and then selecting cycle lengths so that the heat provided by regeneration balances with the heat consumed during reforming.

In addition to providing heat, the reactor regeneration step during a reaction cycle can also allow for coke removal from the catalyst within the reforming zone. In various aspects, one or more types of catalyst regeneration can potentially occur during the regeneration step. One type of catalyst regeneration can correspond to removal of coke from the catalyst. During reforming, a portion of the hydrocarbons introduced into the reforming zone can form coke instead of forming CO. This coke can potentially block access to the catalytic sites (such as metal sites) of the catalyst. In some aspects, the rate of formation can be increased in portions of the reforming zone that are exposed to higher temperatures, such as portions of the reforming zone that are exposed to temperatures of 800° C. or more, or 900° C. or more, or 1000° C. or more. During a regeneration step, oxygen can be present as the temperature of the reforming zone is increased. At the temperatures achieved during regeneration, at least a portion of the coke generated during reforming can be removed as CO or $CO_2$.

It is noted that the coke removal conditions described above can be suitable for removing sulfur from the sulfur-tolerant reforming catalyst. Additionally or alternately, it may be desirable to perform sulfur removal at times different from the times for coke removal. Sulfur removal from the sulfur-tolerant reforming catalyst can be performed at conditions that are mild relative to the coke removal process, such as the catalyst regeneration conditions for sulfur removal described above.

Due to the variation in temperature across the reactor, several options can be used for characterizing the temperature within the reactor and/or within the reforming zone of the reactor. One option for characterizing the temperature can be based on an average bed or average monolith temperature within the reforming zone. In practical settings, determining a temperature within a reactor requires the presence of a measurement device, such as a thermocouple. Rather than attempting to measure temperatures within the reforming zone, an average (bed or monolith) temperature within the reforming zone can be defined based on an average of the temperature at the beginning of the reforming zone and a temperature at the end of the reforming zone. Another option can be to characterize the peak temperature within the reforming zone after a regeneration step in the reaction cycle. Generally, the peak temperature can occur at or near the end of the reforming zone, and may be dependent on the location where combustion is initiated in the reactor. Still another option can be to characterize the difference in temperature at a given location within the reaction zone at different times within a reaction cycle. For example, a temperature difference can be determined between the temperature at the end of the regeneration step and the temperature at the end of the reforming step. Such a temperature difference can be characterized at the location of peak temperature within the reactor, at the entrance to the reforming zone, at the exit from the reforming zone, or at any other convenient location.

In various aspects, the reaction conditions for reforming hydrocarbons can include one or more of an average reforming zone temperature ranging from 400° C. to 1200° (or more); a peak temperature within the reforming zone of 800° C. to 1500° C.; a temperature difference at the location of peak temperature between the end of a regeneration step and the end of the subsequent reforming step of 25° C. or more, or 50° C. or more, or 100° C. or more, or 200° C. or more, such as up to 800° C. or possibly still higher; a temperature difference at the entrance to the reforming zone between the end of a regeneration step and the end of the subsequent reforming step of 25° C. or more, or 50° C. or more, or 100° C. or more, or 200° C. or more, such as up to 800° C. or possibly still higher; and/or a temperature difference at the exit from the reforming zone between the end of a regeneration step and the end of the subsequent reforming step of 25° C. or more, or 50° C. or more, or 100° C. or more, or 200° C. or more, such as up to 800° C. or possibly still higher.

With regard to the average reforming zone temperature, in various aspects the average temperature for the reforming zone can be 400° C. to 1200° C., or 800° C. to 1200° C., or 400° C. to 900° C., or 600° C. to 1100° C., or 500° C. to 1000° C. Additionally or alternately, with regard to the peak temperature for the reforming zone (likely corresponding to a location in the reforming zone close to the location for combustion of regeneration reactants), the peak temperature can be 800° C. to 1500° C., or 1000° C. to 1400° C., or 1200° C. to 1500° C., or 1200° C. to 1400° C.

Additionally or alternately, the reaction conditions for reforming hydrocarbons can include a pressure of 0 psig to 1500 psig (10.3 MPa), or 0 psig to 1000 psig (6.9 MPa), or 0 psig to 550 psig (3.8 MPa); and a gas hourly space velocity of reforming reactants of 1000 $hr^{-1}$ to 50,000 $hr^{1-}$.

In some aspects, an advantage of operating the reaction at elevated temperature can be the ability to convert substantially all of the methane and/or other hydrocarbons in a reforming feed. For example, for a reforming process where water is present in the reforming reaction environment (i.e., steam reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternately, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %

In other aspects, for a reforming process where carbon dioxide is present in the reforming reaction environment (i.e., dry reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternately, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %.

In some alternative aspects, the reforming reaction can be performed under dry reforming conditions, where the reforming is performed with $CO_2$ as a reagent but with a reduced or minimized amount of $H_2O$ in the reaction environment. In such alternative aspects, a goal of the reforming reaction can be to produce a synthesis gas with a $H_2$ to CO ratio of 1.0 or less. In such alternative aspects, the reforming reaction can be performed at a lower average bed temperature, such as a temperature of between 500° C. to 700° C., or 500° C. to 600° C. In such aspects, the ratio of $H_2$ to CO can be 0.3 to 1.0, or 0.3 to 0.7, or 0.5 to 1.0. Performing the dry reforming reaction under these conditions can also lead to substantial coke production, which can require removal during regeneration in order to maintain catalytic activity.

Example of Reverse Flow Reactor Configuration

For endothermic reactions operated at elevated temperatures, such as hydrocarbon reforming, a reverse flow reactor can provide a suitable reaction environment for providing the heat for the endothermic reaction.

In a reverse flow reactor, the heat needed for an endothermic reaction may be provided by creating a high-temperature heat bubble in the middle of the reactor. A two-step process can then be used wherein heat is (a) added to the reactor bed(s) or monolith(s) via in-situ combustion, and then (b) removed from the bed via in-situ endothermic reforming. This type of configuration can provide the ability to consistently manage and confine the high temperature bubble in a reactor region(s) that can tolerate such conditions long term. A reverse flow reactor system can allow the reforming and regeneration processes to be performed in a substantially continuous manner.

A reverse flow reactor system can include first and second reactors, oriented in a series relationship with each other with respect to a common flow path, and optionally but preferably along a common axis. The common axis may be horizontal, vertical, or otherwise. During a regeneration step, reactants are permitted to combine or mix in a reaction zone to combust therein, in-situ, and create a high temperature zone or heat bubble inside a middle portion of the reactor system. The heat bubble can correspond to a temperature that is at least about the initial temperature for reforming. Typically, the temperature of the heat bubble can be greater than the initial reforming temperature, as the temperature will decrease as heat is transferred from the heat bubble in a middle portion of the reactor toward the ends of the reactor. In some aspects, the combining can be enhanced by a reactant mixer that mixes the reactants to facilitate substantially complete combustion/reaction at the desired location, with the mixer optionally located between the first and second reactors. The combustion process can take place over a long enough duration that the flow of first and second reactants through the first reactor also serves to displace a substantial portion, (as desired) of the heat produced by the reaction (e.g., the heat bubble), into and at least partially through the second reactor, but preferably not all of the way through the second reactor to avoid waste of heat and overheating the second reactor. The flue gas may be exhausted through the second reactor, but preferably most of the heat is retained within the second reactor. The amount of heat displaced into the second reactor during the regeneration step can also be limited or determined by the desired exposure time or space velocity that the hydrocarbon feed gas will have in the reforming environment.

After regeneration or heating the second reactor media, in the next/reverse step or cycle, methane (and/or natural gas and/or another hydrocarbon) can be supplied or flowed through the second reactor, from the direction opposite the direction of flow during the heating step. The methane can contact the hot second reactor and mixer media, in the heat bubble region, to transfer the heat to the methane for reaction energy.

For some aspects, the basic two-step asymmetric cycle of a reverse flow regenerative bed reactor system is depicted in FIGS. 1(a) and 1(b) of FIG. 1 in terms of a reactor system having two zones/reactors; a first or recuperator/quenching zone (7) and a second or reaction/reforming zone (1). Both the reaction zone (1) and the recuperator zone (7) can contain regenerative monoliths and/or regenerative beds. Regenerative monoliths and beds, as used herein, comprise materials that are effective in storing and transferring heat. The terms regenerative reactor monoliths and regenerative reactor bed(s) mean regenerative monoliths and/or beds that may also be used for carrying out a chemical reaction. The regenerative monoliths and/or beds may comprise bedding or packing material such as glass or ceramic beads or spheres, metal beads or spheres, ceramic (including zirconia) or metal honeycomb materials, ceramic tubes, extruded monoliths, and the like, provided they are competent to maintain integrity, functionality, and withstand long term exposure to temperatures in excess of 1200° C., or in excess of 1400° C., or in excess of 1600° C., which can allow for some operating margin. Additionally, the regenerative monoliths and/or beds that correspond to regenerative reactor monoliths or beds can have a sufficiently high surface area to allow for coating/impregnation of the monolith or bed surface area with a desirable amount of catalyst.

As shown in FIG. 1(a) of FIG. 1, at the beginning of the "reaction" step of the cycle, a secondary end 5 of the reaction zone 1 (a.k.a. herein as the reformer or second reactor) can be at an elevated temperature as compared to the primary end 3 of the reaction bed 1, and at least a portion (including the first end 9) of the recuperator or quench zone 7, can be at a lower temperature than the reaction zone 1 to provide a quenching effect for the synthesis gas reaction product. A methane-containing reactant feed (or other hydrocarbon-containing reactant feed) can be introduced via a conduit(s) 15, into a primary end 3 of the reforming or reaction zone 1. In various aspects, the hydrocarbon-containing reactant feed can also contain $H_2O$, $CO_2$, or a combination thereof.

The feed stream from inlet(s) 15 can absorb heat from the reformer bed 1 and endothermically react to produce the desired synthesis gas product. As this step proceeds, a shift in the temperature profile 2, as indicated by the arrow, can be created based on the heat transfer properties of the system. When the bed is designed with adequate heat transfer capability, this profile can have a relatively sharp temperature gradient, which gradient can move across the reaction zone 1 as the reforming step proceeds. In some aspects, a sharper temperature gradient profile can provide for improved control over reaction conditions.

The effluent from the reforming reaction, which can include unreacted feed components (hydrocarbons, $H_2O$, $CO_2$) as well as synthesis gas components, can exit the reaction zone 1 through a secondary end 5 at an elevated temperature and pass through the recuperator reactor 7, entering through a second end 11, and exiting at a first end 9. The recuperator 7 can initially be at a lower temperature than the reaction zone 1. As the products (and optionally unreacted feed) from the reforming reaction pass through the recuperator zone 7, the gas can be quenched or cooled to a temperature approaching the temperature of the recuperator zone substantially at the first end 9, which in some embodiments can be approximately the same temperature as the regeneration feed introduced via conduit 19 into the recuperator 7 during the second step of the cycle. As the reforming effluent is cooled in the recuperator zone 7, a temperature gradient 4 can be created in the zone's regenerative bed(s) and can move across the recuperator zone 7 during this step. The quenching can heat the recuperator 7, which can be cooled again in the second step to later provide another quenching service and to prevent the size and location of the heat bubble from growing progressively through the quench reactor 7. After quenching, the reaction gas can exit the recuperator at 9 via conduit 17 and can be processed for separation and recovery of the various components.

The second step of the cycle, referred to as the regeneration step, can then begin with reintroduction of the first and second regeneration reactants via conduit(s) 19. The first and second reactants can pass separately through hot recuperator 7 toward the second end 11 of the recuperator 7, where they can be combined for exothermic reaction or combustion in or near a central region 13 of the reactor system.

An example of the regeneration step is illustrated in FIG. 1(b) of FIG. 1. Regeneration can entail transferring recovered sensible heat from the recuperator zone 7 to the reaction zone 1 to thermally regenerate the reaction beds 1 for the subsequent reaction cycle. Regeneration gas/reactants can enter recuperator zone 7, such as via conduit(s) 19, and flow through the recuperator zone 7 and into the reaction zone 1. In doing so, the temperature gradients 6 and 8 may move across the beds as illustrated by the arrows on the exemplary graphs in FIG. 1(b), similar to but in opposite directions to the graphs of the temperature gradients developed during the reaction cycle in FIG. 1(a) of FIG. 1. Fuel and oxidant reactants may combust at a region proximate to the interface 13 of the recuperator zone 7 and the reaction zone 1. The heat recovered from the recuperator zone together with the heat of combustion can be transferred to the reaction zone, thermally regenerating the regenerative reaction monoliths and/or beds 1 disposed therein.

In some aspects, several of the conduits within a channel may convey a mixture of first and second reactants, due at least in part to some mixing at the first end (17) of the first reactor. However, the numbers of conduits conveying combustible mixtures of first and second reactants can be sufficiently low such that the majority of the stoichiometrically reactable reactants will not react until after exiting the second end of the first reactor. The axial location of initiation of combustion or exothermic reaction within those conduits conveying a mixture of reactants can be controlled by a combination of temperature, time, and fluid dynamics. Fuel and oxygen usually require a temperature-dependent and mixture-dependent autoignition time to combust. Still though, some reaction may occur within an axial portion of the conduits conveying a mixture of reactants. However, this reaction can be acceptable because the number of channels having such reaction can be sufficiently small that there is only an acceptable or inconsequential level of effect upon the overall heat balance within the reactor. The design details of a particular reactor system can be selected so as to avoid mixing of reactants within the conduits as much as reasonably possible.

FIG. 2 illustrates another exemplary reactor system that may be suitable in some applications for controlling and deferring the combustion of fuel and oxidant to achieve efficient regeneration heat. FIG. 2 depicts a single reactor system, operating in the regeneration cycle. The reactor system may be considered as comprising two reactors zones. The recuperator 27 can be the zone primarily where quenching takes place and provides substantially isolated flow paths or channels for transferring both of the quenching reaction gases through the reactor media, without incurring combustion until the gasses arrive proximate or within the reactor core 13 in FIG. 1. The reformer 2 can be the reactor where regeneration heating and methane (and/or hydrocarbon) reformation primarily occurs, and may be considered as the second reactor for purposes herein. Although the first and second reactors in the reactor system are identified as separately distinguishable reactors, it is understood that the first and second reactors may be manufactured, provided, or otherwise combined into a common single reactor bed, whereby the reactor system might be described as comprising merely a single reactor that integrates both cycles within the reactor. The terms "first reactor" and "second reactor" can merely refer to the respective zones within the reactor system whereby each of the regeneration, reformation, quenching, etc., steps take place and do not require that separate components be utilized for the two reactors. However, various aspects can comprise a reactor system whereby the recuperator reactor includes conduits and channels as described herein, and the reformer reactor may similarly possess conduits. Additionally or alternately, some aspects may include a reformer reactor bed that is arranged different from and may even include different materials from, the recuperator reactor bed.

As discussed previously, the first reactor or recuperator 27 can include various gas conduits 28 for separately channeling two or more gases following entry into a first end 29 of the recuperator 27 and through the regenerative bed(s) disposed therein. A first gas 30 can enter a first end of a plurality of flow conduits 28. In addition to providing a flow channel, the conduits 28 can also comprise effective flow barriers (e.g., which effectively function such as conduit walls) to prevent cross flow or mixing between the first and second reactants and maintain a majority of the reactants effectively separated from each other until mixing is permitted. As discussed previously, each of the first and second channels can comprise multiple channels or flow paths. The first reactor may also comprise multiple substantially parallel flow segments, each comprising segregated first and second channels.

In some aspects, the recuperator can be comprised of one or more extruded honeycomb monoliths, as described above. Each monolith may provide flow channel(s) (e.g., flow paths) for one of the first or second reactants. Each channel preferably includes a plurality of conduits. Alternatively, a monolith may comprise one or more channels for each reactant with one or more channels or groups of conduits dedicated to flowing one or more streams of a reactant, while the remaining portion of conduits flow one or more streams of the other reactant. It is recognized that at the interface between channels, a number of conduits may convey a mixture of first and second reactant, but this number of conduits is proportionately small.

Alternative embodiments may use reactor media other than the described monoliths, such as whereby the channel conduits/flow paths may include a more tortuous pathways (e.g. convoluted, complex, winding and/or twisted but not linear or tubular), than the previously described monoliths, including but not limited to labyrinthine, variegated flow paths, conduits, tubes, slots, and/or a pore structure having channels through a portion(s) of the reactor and may include barrier portion, such as along an outer surface of a segment or within sub-segments, having substantially no effective permeability to gases, and/or other means suitable for preventing cross flow between the reactant gases and maintaining the first and second reactant gases substantially separated from each other while axially transiting the recuperator 27. For such embodiments, the complex flow path may create a lengthened effective flow path, increased surface area, and improved heat transfer. Such design may be preferred for reactor embodiments having a relatively short axial length through the reactor. Axially longer reactor lengths may experience increased pressure drops through the reactor. However for such embodiments, the porous and/or permeable media may include, for example, at least one of a packed bed, an arrangement of tiles, a permeable solid media, a substantially honeycomb-type structure, a fibrous arrangement, and a mesh-type lattice structure.

In some aspects, the reverse flow reactor can include some type of equipment or method to direct a flow stream of one of the reactants into a selected portion of the conduits. In the exemplary embodiment of FIG. 2, a gas distributor 31 can direct a second gas stream 32 to second gas stream channels that are substantially isolated from or not in fluid communication with the first gas channels, here illustrated as channels 33. The result can be that at least a portion of gas stream 33 is kept separate from gas stream 30 during axial transit of the recuperator 27. In some aspects, the regenerative bed(s) and/or monolith(s) of the recuperator zone can comprise channels having a gas or fluid barrier that isolates the first reactant channels from the second reactant channels. Thereby, both of the at least two reactant gases that transit the channel means may fully transit the regenerative bed(s), to quench the regenerative bed, absorb heat into the reactant gases, before combining to react with each other in the combustion zone.

In various aspects, gases (including fluids) 30 and 32 can each comprise a component that reacts with a component in the other reactant 30 and 32, to produce an exothermic reaction when combined. For example, each of the first and second reactant may comprise one of a fuel gas and an oxidant gas that combust or burn when combined with the other of the fuel and oxidant. By keeping the reactants substantially separated, the location of the heat release that occurs due to exothermic reaction can be controlled. In some aspects "substantially separated" can be defined to mean that at least 50 percent, or at least 75 percent, or at least 90 percent of the reactant having the smallest or limiting stoichiometrically reactable amount of reactant, as between the first and second reactant streams, has not become consumed by reaction by the point at which these gases have completed their axial transit of the recuperator 27. In this manner, the majority of the first reactant 30 can be kept isolated from the majority of the second reactant 32, and the majority of the heat release from the reaction of combining reactants 30 and 32 can take place after the reactants begin exiting the recuperator 27. The reactants can be gases, but optionally some reactants may comprise a liquid, mixture, or vapor phase.

The percent reaction for these regeneration streams is meant the percent of reaction that is possible based on the stoichiometry of the overall feed. For example, if gas 30 comprised 100 volumes of air (80 volumes $N_2$ and 20 Volumes $O_2$), and gas 32 comprised 10 volumes of hydrogen, then the maximum stoichiometric reaction would be the combustion of 10 volumes of hydrogen ($H_2$) with 5 volumes of oxygen ($O_2$) to make 10 volumes of $H_2O$. In this case, if 10 volumes of hydrogen were actually combusted in the recuperator zone (27), this would represent 100% reaction of the regeneration stream. This is despite the presence of residual un-reacted oxygen, because in this example the un-reacted oxygen was present in amounts above the stoichiometric requirement. Thus, in this example the hydrogen is the stoichiometrically limiting component. Using this definition, less than 50% reaction, or less than 25% reaction, or less than 10% reaction of the regeneration streams can occur during the axial transit of the recuperator (27).

In various aspects, channels 28 and 33 can comprise ceramic (including zirconia), alumina, or other refractory material capable of withstanding temperatures exceeding 1200° C., or 1400° C., or 1600° C. Additionally or alternately, channels 28 and 33 can have a wetted area between 50 ft$^{-1}$ and 3000 ft$^{-1}$, or between 100 ft$^{-1}$ and 2500 ft$^{-1}$, or between 200 ft$^{-1}$ and 2000 ft$^{1-}$.

Referring again briefly to FIG. 1, the reactor system can includes a first reactor 7 containing a first end 9 and a second end 11, and a second reactor 1 containing a primary end 3 and a secondary end 5. The embodiments illustrated in FIGS. 1 and 2 are merely simple illustrations provided for explanatory purposes only and are not intended to represent a comprehensive embodiment. Reference made to an "end" of a reactor merely refers to a distal portion of the reactor with respect to an axial mid-point of the reactor. Thus, to say that a gas enters or exits an "end" of the reactor, such as end 9, means merely that the gas may enter or exit substantially at any of the various points along an axis between the respective end face of the reactor and a mid-point of the reactor, but more preferably closer to the end face than to the mid-point. Thereby, one or both of the first and second reactant gases could enter at the respective end face, while the other is supplied to that respective end of the reactor through slots or ports in the circumferential or perimeter outer surface on the respective end of the reactor.

Reforming and Regeneration Conditions—On-Board Reforming

One example of a reaction environment that can benefit from a sulfur-tolerant reforming catalyst is on-board reforming of fuel for an internal combustion engine. For example, the sulfur-tolerant reforming catalyst can be included in a reformer for use in an exhaust gas recycle portion of an internal combustion engine powertrain. The exhaust gas-containing mixture can typically comprise engine exhaust gas and a first hydrocarbon-containing fuel. At least a portion of the exhaust gas-containing mixture can be passed to the reformer and converted by the catalyst composition in the presence of heat to a reformed gaseous mixture (product) having an increased content of $H_2$ relative to the mixture of exhaust gas and first hydrocarbon-containing fuel. The reformed gaseous mixture and a second hydrocarbon-containing fuel may be provided to the engine for combustion. Typically, the second hydrocarbon-containing fuel can be the same as the first hydrocarbon-containing fuel (i.e., it can be convenient to draw both the first and second hydrocarbon-containing fuels from a common source or tank, in some embodiments), although this need not always be the case. Where desired, the second hydrocarbon-containing fuel may be different from the first hydrocarbon-containing fuel. The reformed gaseous mixture and second hydrocarbon-containing fuel can then be combusted in the engine to form an exhaust gas. The exhaust gas can be passed through a first heat exchanger to extract heat therefrom. The heat can be transferred to the reformer to aid in sustaining the reforming reactions therein.

In this type of environment, the reforming catalyst can be used alone, or the reforming catalyst may be used in conjunction with and/or integrated with other catalysts, such as cracking catalysts and/or methanation catalysts. One goal of using additional types of catalysts can be to help maintain a desired temperature in the on-board reforming reaction environment. For example, it can be desirable to maintain an average temperature for the reforming catalyst in the reforming environment and/or average inlet temperature to the reforming environment of 450° C. to 650° C. Additionally or alternately, the outlet temperature of the reformer (i.e., the reforming environment) can be 435° C. to 600° C.

Another option for maintaining and/or increasing the temperature of a reforming reactor can be to use pre-combustion of a portion of the fuel as a source of heat for the reforming reactor. Pre-combustion can allow the inlet temperature for the reforming reactor to be varied without having to vary some other temperature within the engine. Conventionally, pre-combustion of fuel to provide heat for a reformer in an engine is not preferred, as any fuel burned to heat the reformer represents fuel that cannot be used to drive the powertrain. However, due to kinetic and or thermodynamic limitations on the reforming reactions at low temperature, using pre-combustion can allow increasing the amount of conversion before the kinetic or thermodynamically limited temperature is reached. For example, pre-combustion can allow the inlet temperature of the reformer to be increased to a temperature of 525° C. to 650° C. The resulting increase in enthalpy of the product mix due to the reforming reaction can raise the heat of combustion, which can essentially offset the loss in efficiency due to the pre-combustion. This can be desirable up to a point where raising the feed temperature by pre-combustion would lead to significant heat losses to the surrounding; e.g., a temperature over 650° C.

In some aspects, the reforming reaction can be performed in the presence of a reduced or minimized amount of water. During conventional reforming, the molar ratio of the amount of water in the reaction environment to the number of carbon atoms in the feed for reforming can be at least 3.0. It has been determined that by performing the reforming in the presence of a suitable catalyst, the molar ratio of water to carbon atoms in the feed can be from 0.3 to 1.0. Operating the reforming with a reduced amount of water can be beneficial, as this amount of water can be provided by an exhaust gas recycle stream.

Such a reformer may be used in a method of operating an internal combustion engine. The methane produced in the reformer may be used for using methane-assisted combustion in the engine. This may be accomplished, e.g., by providing an exhaust gas-containing mixture to an exhaust gas recycle reformer. The exhaust gas-containing mixture can typically comprise engine exhaust gas and a first hydrocarbon-containing fuel. At least a portion of the exhaust gas-containing mixture can be passed to the reformer and converted by the catalyst composition in the presence of heat to a reformed gaseous mixture (product) comprising $CH_4$, $H_2$, $CO_2$, $CO$, $H_2O$, and $N_2$, said $CH_4$ optionally being present at a concentration greater than ~1.0 mol %, based on the total moles of gas in the reformed gaseous mixture. The reformed gaseous mixture and a second hydrocarbon-containing fuel may be provided to the engine for combustion. Typically, the second hydrocarbon-containing fuel can be the same as the first hydrocarbon-containing fuel (i.e., it can be convenient to draw both the first and second hydrocarbon-containing fuels from a common source or tank, in some embodiments), although this need not always be the case. Where desired, the second hydrocarbon-containing fuel may be different from the first hydrocarbon-containing fuel. The reformed gaseous mixture and second hydrocarbon-containing fuel can then be combusted in the engine to form an exhaust gas. The exhaust gas can be passed through a first heat exchanger to extract heat therefrom. The heat can be transferred to the reformer to aid in sustaining the reforming and methane-forming reactions therein.

The use of a sulfur-tolerant reforming catalyst can also serve to provide an increase in the octane rating of an internal combustion engine exhaust gas stream. An exhaust gas-containing mixture may be provided to an exhaust gas recycle reformer including a catalyst as described herein. The exhaust gas-containing mixture can typically comprise engine exhaust gas and a first hydrocarbon-containing fuel. The first hydrocarbon-containing fuel can typically have a relatively low initial octane rating, such as from 65 RON to 100 RON. The catalyst composition in the reformer converts at least a portion of the exhaust gas-containing mixture to a reformed gaseous mixture having a second octane rating (RON) higher than the initial octane rating of the first hydrocarbon-containing fuel.

The reformer may also be incorporated into an internal combustion engine powertrain. Many different variations of such power trains are known. One such powertrain envisioned can include an internal combustion engine having an exhaust manifold and a fuel intake manifold. A reformer comprising a catalyst composition as described herein can fluidly connect a branch of the exhaust manifold and the fuel intake manifold. The reformer and catalyst composition can be specifically configured to convert an exhaust gas-containing mixture from the exhaust manifold gas and a first hydrocarbon-containing fuel to a reformed gaseous mixture comprising $H_2$, CO, and $CH_4$, along with one or more exhaust gas constituents—typically including $N_2$, $H_2O$, $CO_2$, trace quantities of minor species such as $NO_x$ and $SO_x$, and the like. Conversion of a hydrocarbon feed should be understood to be calculated solely by the ratio of the difference between the mass (or number of moles) of hydrocarbon component of the feed entering the inlet of the reforming zone and the mass (or number of moles) of hydrocarbon component exiting the outlet of the reforming zone, divided by the mass (or number of moles) of hydrocarbon component of the feed entering the inlet of the reforming zone. Typically, the intake manifold can be configured to provide a reformed fuel mixture from the exhaust gas recycle unit and a second hydrocarbon-containing fuel to the internal combustion engine for combustion. As described above, the first and second hydrocarbon-containing fuels may be the same or different.

The stream from an exhaust gas recycle unit (EGR stream) can comprise substantially components from the exhaust of the engine, which may represent a portion or substantially all the exhaust from the engine. This EGR stream typically comprises $N_2$, water vapor ($H_2O$), $CO_2$, and un-combusted hydrocarbons and small amounts of CO and $O_2$. The hydrocarbon-containing fuel can be a conventional fuel, such as gasoline, and may optionally be the primary fuel supplied to the engine by direct injection into the engine. However, other fuels can be used instead of or in combination with the conventional fuel (gasoline). Other such fuels can include, but are not necessarily limited to, LPG (liquefied petroleum gas), light ends, $C_2$-$C_{12}$ paraffins, naphtha, kerosene, diesel, FCC off-gas, oxygenated hydrocarbons (e.g., dialkyl ethers such as dimethyl ether, diethyl ether, methyl ethyl ether, and the like, and combinations thereof; $C_1$-$C_{12}$ alcohols such as methanol, ethanol, 1-propanol, isopropanol, 1-butanol, 2-butanol, isobutanol, a pentanol, a hexanol, and the like, and combinations thereof; fatty acid alkyl esters, for instance from mono-, di-, and/or tri-glyceride reaction with a $C_1$-$C_4$ alcohol, such as represented by FAME, FAEE, and the like, and combinations thereof; and the like; and combinations thereof), hydrocarbon-rich gas overhead from a refinery process, hydrocarbon-rich off-gas from a chemical process, or the like, or combinations thereof.

Whatever fuel is used as a feed in the methods described herein, it can advantageously have one, two, or all of the following characteristics: a relatively high paraffin content, no more than a modest aromatics content, and a relatively small content of polynuclear aromatics (PNAs, meaning compounds having two or more aromatic rings in its structure, typically two or more aromatic rings connected to each other, e.g., sharing two carbon atoms between them). The overall aromatics content of the hydrocarbon-containing fuel to be fed into the reforming zone, relative to the weight of hydrocarbons, can advantageously be no more than 35 wt %, or no more than 20 wt %, or no more than 10 wt %, based on the weight of the hydrocarbon-containing fuel, such as down to 1 wt %, or down to 0.1 wt %, or possibly still lower. Additionally or alternately, the paraffin content of the hydrocarbon-containing fuel to be fed into the reforming zone, relative to the weight of hydrocarbons, can advantageously be 10 wt % to 99 wt %, or 40 wt % to 95 wt %, or 60 wt % to 99 wt %.

Figure 3:
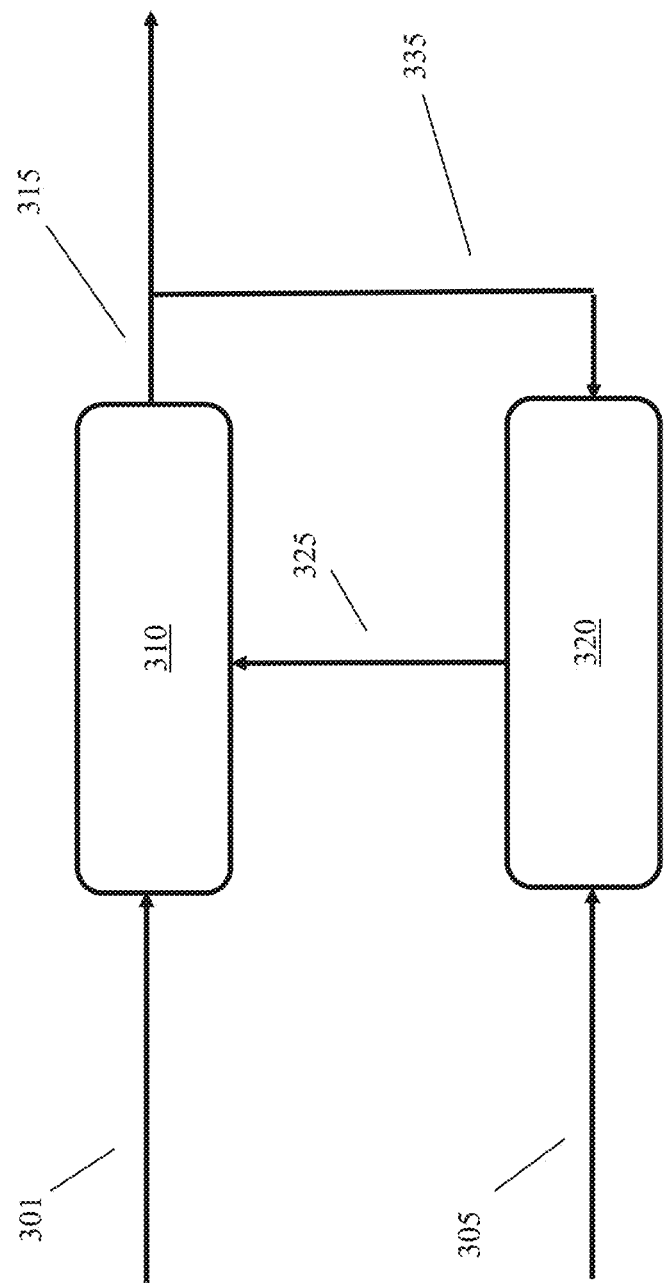
FIG. 3 shows an overview of a process flow for on-board reforming.

FIG. 3 schematically shows an overview of an on-board reforming process within an engine, such as a vehicle engine. During on-board reforming, a hydrocarbon-containing fuel can be reformed to modify the combustion characteristics of the fuel. In the example shown in FIG. 3, a spark ignition engine 310 can have an associated reforming stage 320. Fuel 305 for the spark ignition engine can initially be passed into reforming stage 320 along with an exhaust gas recycle stream 335. After reforming in reforming stage 320, the reformer effluent 325 can be passed into the spark ignition engine 310 for combustion, either alone or in combination with another fuel (not shown). The spark ignition engine 310 can also receive an air stream 301 (or another oxygen-containing stream) to facilitate combustion of the reformer effluent 325 and/or other fuel. The combustion reaction in engine 310 can generate exhaust 315, a portion of which can be used to form exhaust gas recycle stream 335.

Example 1—Preparation of Sulfur-Tolerant Reforming Catalyst

A catalyst including rhodium and platinum supported on a catalyst support composed of silica and alumina was made. 10 grams of a silica-alumina carrier (Sasol SIRAL® 40) that included 40 wt % $SiO_2$ was treated in flowing steam at 700° C. for 24 hours. 1 gram of rhodium precursor solution (10 wt % rhodium nitrate in water) and 1 gram of platinum precursor solution (3.6 wt % tetramineplatinum nitrate in water) were added to 19 grams of water. The combined rhodium and platinum precursor solution was added to the 10 grams of steamed silica-alumina carrier by incipient wetness impregnation. The resulting composition was then heated in air at 350° C. for 3 hours. After heating, the catalyst was characterized using X-ray fluorescence (XRF). The resulting catalyst included 1.4 wt % rhodium, 0.5 wt % platinum, 34 wt % aluminum, 16 wt % silicon, and 48 wt % oxygen.

Figure 4:
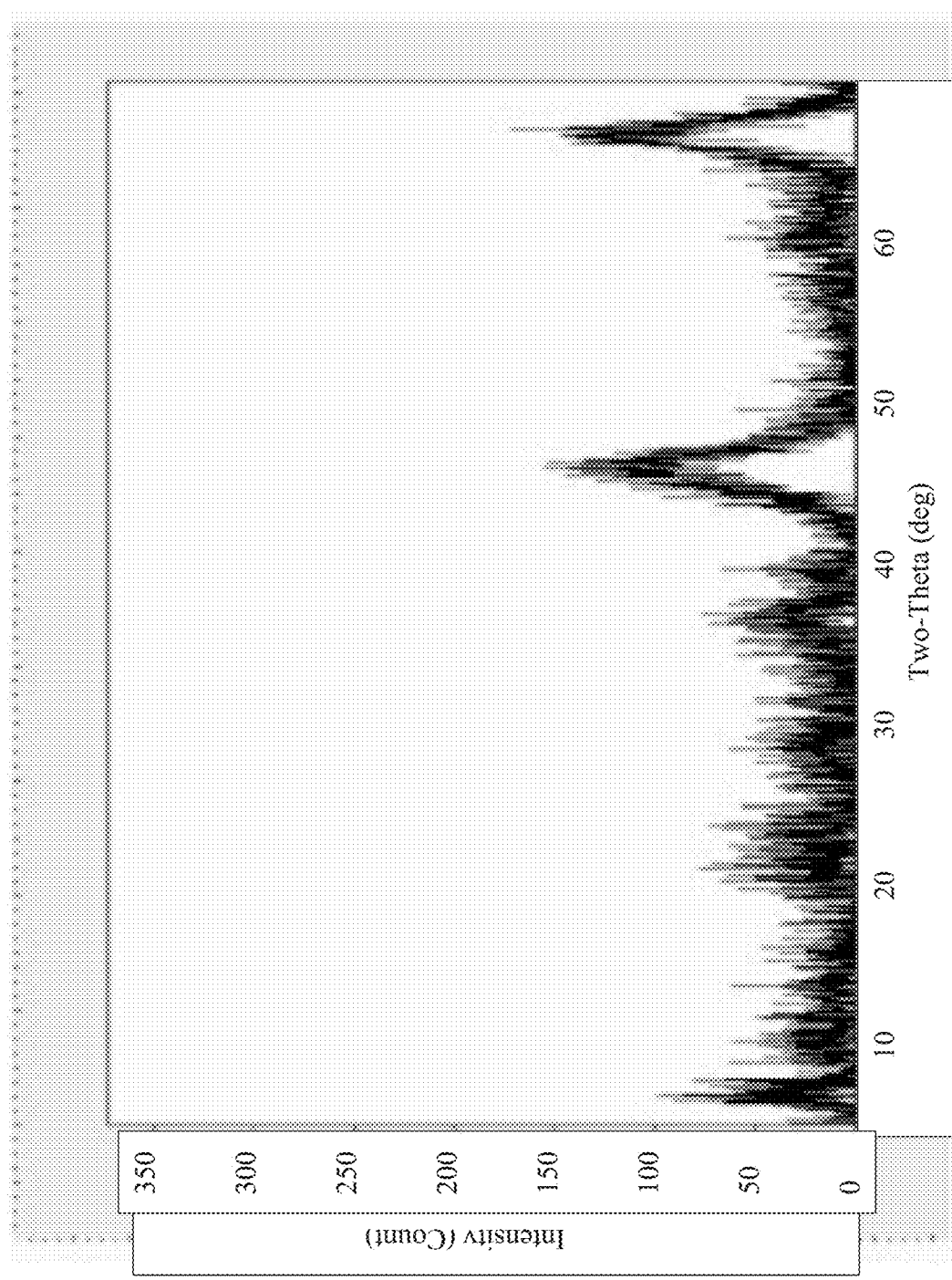
FIG. 4 shows an X-ray diffraction pattern of a sulfur-tolerant catalyst that includes bulk alumina.

After heating, the catalyst was also characterized using X-ray diffraction (XRD). The XRD pattern from the catalyst is shown in FIG. 4. As shown in FIG. 4, the catalyst was mostly amorphous, but also included a detectable amount of a bulk gamma-alumina phase, as indicated by the 2θ peak between 45° and 48°.

Figure 5:
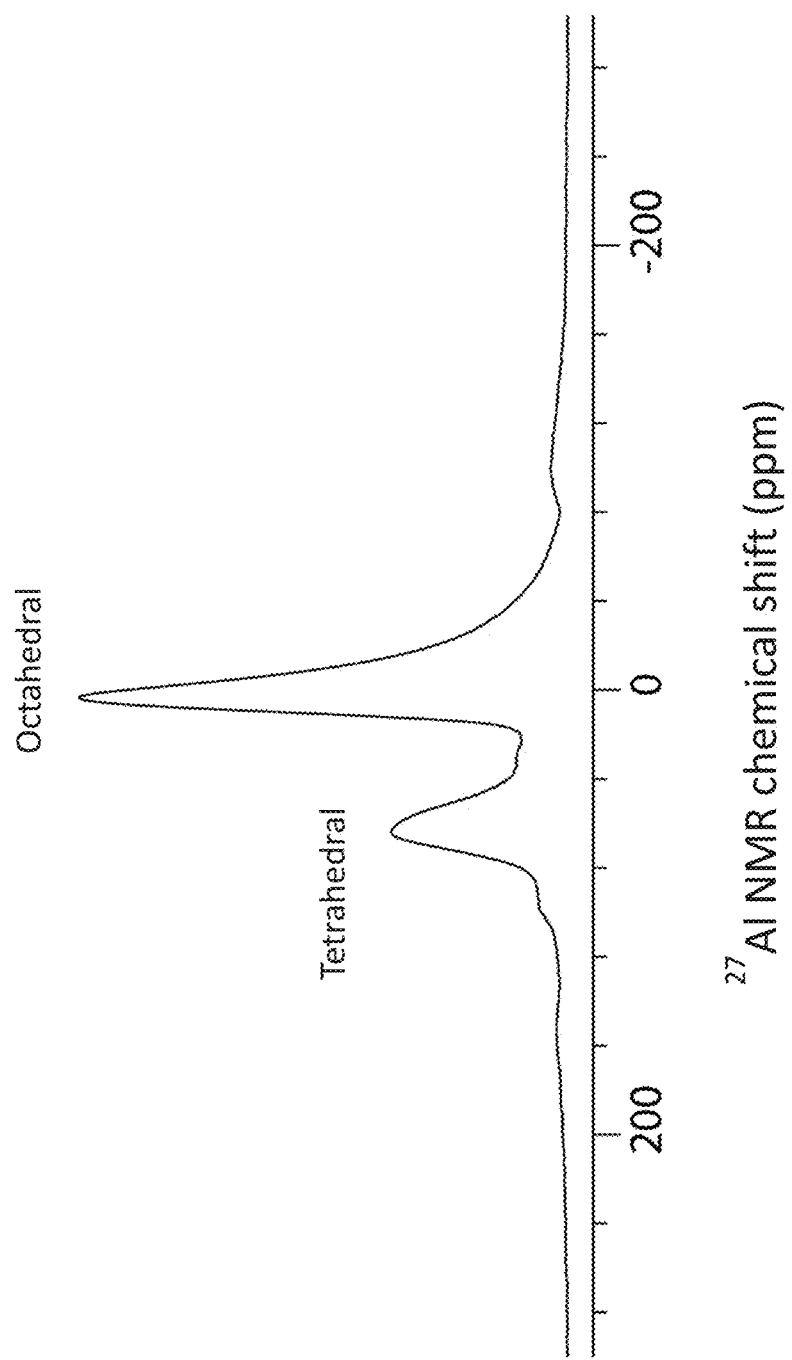
FIG. 5 shows $^{27}$Al-NMR spectroscopy data for characterizing a catalyst support containing alumina that is suitable for use in a sulfur-tolerant reforming catalyst.

The support for the catalyst was also separately characterized using $^{27}$Al-NMR. As shown in FIG. 5, the alumina in the support corresponded to roughly 33 mol % tetrahedral alumina, which has chemical shift between about 40 and 80 ppm, and roughly 67 mol % octahedral alumina, which has chemical shift between about 20 and −40 ppm. The substantial portion of octahedrally-coordinated alumina in the silica sample provides further evidence for the presence of bulk alumina within the support.

Example 2—Preparation of Alumina-Containing Reforming Catalyst (Comparative)

A comparative catalyst including rhodium, platinum, alumina, lanthana, ceria, and zirconia was made. The comparative catalyst included 1.0 wt % rhodium and 0.4 wt % platinum supported on a mixed metal oxide comprising $La_2O_3$-γ-$Al_2O_3$ (36.5 wt % of total) and $CeO_2$—$ZrO_2$ (60 wt % of total). The $La_2O_3$—$Al_2O_3$ support was prepared separately by impregnation of an aqueous $La(NO_3)_3$ solution onto γ-$Al_2O_3$ (~4.5 wt % $La_2O_3$). The impregnated γ-$Al_2O_3$ was dried and calcined at ~600° C. $CeO_2$—$ZrO_2$ was co-precipitated from an aqueous $Ce(NO_3)_4$ and $Zr(NO_3)_4$ solution onto the $La_2O_3$—$Al_2O_3$ support using urea as base. The Ce:Zr atomic ratio was ~4:1. The La-γ-$Al_2O_3$—$CeO_2$—$ZrO_2$ support was calcined at 600° C. prior to incipient wetness impregnation with the aqueous solution containing rhodium and platinum precursors described in Example 1. After the precious metal impregnation, the catalyst was calcined in air at ~600° C. XRF was used to determine a composition for the comparative catalyst of 1.0 wt % rhodium, 0.4 wt % platinum, 1.4 wt % lanthanum, 29 wt % aluminum, 7 wt % zirconium, 26 wt % cerium, and 35 wt % oxygen. Based on the inclusion of lanthana, alumina, ceria, and zirconia in the support, the catalyst support is referred to herein as LACZ.

Example 3—Reforming Using Sulfur-Tolerant Catalyst and Comparative Catalyst

The catalysts made in Examples 1 and 2 were used as reforming catalysts in a laboratory scale environment. The feed for reforming was selected to be representative of combining a natural gas fuel with an exhaust gas recycle flow from the engine. The feed included 12 vol % $CH_4$, 0.4 vol % $C_2H_6$, 0.1 vol % $C_3H_8$, 16 vol % $H_2O$, and 8.0 vol % $CO_2$, with the balance corresponding to $N_2$. The sulfur content of the feed was 3 vppm. The reforming conditions were a pressure of 2 bar-a (~200 kPa-a), a temperature of 500° C., and a residence time of 1.0 g Rh-sec/g of $CH_4$. It is noted that if all of the hydrocarbon components in the natural gas are considered, the residence time corresponds to 1.1 g Rh-sec/g of natural gas.

Initially, the feed was exposed to the reforming catalyst under the specified conditions for 5 hours. The feed was then stopped and the catalyst was regenerated for 7 seconds in the presence of a regeneration gas containing 1.5 vol % $O_2$, 8.0 vol % $CO_2$, and 15 vol % $H_2O$, with the balance corresponding to nitrogen. The temperature and pressure used during reforming were also used during regeneration. After the initial regeneration, a periodic cycle of reforming and regeneration was used. The periodic cycle corresponded to ~1 hour of reforming followed by 7 seconds of regeneration.

Table 1 shows the results from reforming using the sulfur-tolerant catalyst with a silica-alumina (SA) support and the comparative catalyst with the LACZ support.

TABLE 1

Catalyst performance with Sulfur containing NG

| Catalyst Conditions | Methane Conversion (%) | | $H_2$ yield (mole $H_2$/mole $CH_4$ feed) | |
|---|---|---|---|---|
| | Rh/Pt/LACZ | Rh/Pt/SA | Rh/Pt/LACZ | Rh/Pt/SA |
| Fresh | 16% | 22% | 0.8 | 1.0 |
| After 5 hour on sulfur-containing feed | 0% | 0% | 0 | 0 |
| After 7 sec regeneration protocol | 0% | 14% | 0 | 0.8 |
| After 800 hours of feed/regeneration cycling | — | 13% | 0 | 0.8 |

As shown in Table 1, both of the reforming catalysts initially had activity for methane conversion, as indicated by the 16 mol % or 22 mol % conversion of methane for the fresh versions of the catalysts. Both of the reforming catalysts also had little or no reforming activity after the initial 5 hour exposure to the sulfur-containing reforming feed. However, after the initial regeneration, the sulfur-tolerant catalyst (SA support) regained a substantial amount of reforming activity, and was still able to convert 13 mol % of the methane in the feed after 800 hours of periodic cycling between the sulfur-containing reforming feed and the regeneration feed. By contrast, the catalyst with the LACZ support did not regain reforming activity after regeneration. Thus, the sulfur-tolerant reforming catalyst, including a support containing bulk alumina, provided an unexpected ability to retain reforming activity (with regeneration) after longer exposures to a sulfur-containing feed. Without being bound by any particular theory, it is believed that the sulfur in the feed can react with the metals on the catalyst. After this reaction, the metal is no longer effective for reforming.

ADDITIONAL EMBODIMENTS

Embodiment 1

A method for reforming a hydrocarbon-containing stream, comprising: exposing a hydrocarbon-containing stream comprising 0.1 vppm or more of sulfur to a catalyst in the presence of at least one of $H_2O$ and $CO_2$ under reforming conditions (optionally comprising a reforming time period) to form a reformed product comprising $H_2$, and exposing the catalyst to a stream comprising 0.1 vol % or more of $O_2$ at a regeneration temperature for a regeneration time period, wherein the catalyst comprises 0.1 wt % to 10.0 wt % of a Group VIII metal on a sulfur-tolerant support comprising bulk alumina.

Embodiment 2

The method of Embodiment 1, wherein the catalyst is periodically exposed to a stream comprising 0.1 vol % or more of $O_2$ at a regeneration temperature for a regeneration time period.

Embodiment 3

The method of any of the above embodiments, wherein the regeneration temperature comprises 200° C. to 700° C.;

or wherein a molar ratio of $O_2$ delivered during the regeneration time period to sulfur exposed to the catalyst during the reforming time period is 20 or more; or a combination thereof.

Embodiment 4

The method of any of the above embodiments, wherein the sulfur-tolerant support comprises 1.0 wt % to 80 wt % alumina; or wherein the sulfur-tolerant support comprises 1.0 mol % to 80 mol % of at least one of silicon, titanium, or zirconium relative to the sum of the moles of aluminum, silicon, titanium, or zirconium in the sulfur-tolerant support; or wherein the sulfur-tolerant support comprises alumina with octahedral coordination; or wherein the sulfur-tolerant support comprises at least one of silica, titania, and zirconia; or a combination thereof.

Embodiment 5

The method of any of the above embodiments, wherein the Group VIII metal comprises Rh, Pd, Pt, or a combination thereof, the catalyst optionally further comprising a Group IB metal.

Embodiment 6

The method of any of the above embodiments, wherein the hydrocarbon-containing stream is exposed to the catalyst in a reverse flow reactor, the hydrocarbon-containing stream optionally comprising 5.0 wt % or more $C_{2+}$ hydrocarbons, 40 wt % or more methane, or a combination thereof.

Embodiment 7

The method of any of Embodiments 1-5, wherein the hydrocarbon-containing stream comprises a fuel for a spark ignition engine.

Embodiment 8

The method of Embodiment 7, wherein the exposing the hydrocarbon-containing stream to the catalyst further comprises exposing a recycle portion of an exhaust gas from combustion of at least a portion of the reformed product to the catalyst.

Embodiment 9

The method of any of the above embodiments, wherein the hydrocarbon-containing stream comprises 0.1 vppm to 20 vppm of sulfur.

Embodiment 10

The method of any of the above embodiments, wherein the catalyst comprises a first catalytic metal and a second catalytic metal, the first catalytic metal comprising Rh, Ni, or a combination thereof, the second catalytic metal comprising Pt, Pd, or a combination thereof, a weight ratio of the first catalytic metal to the second catalytic metal optionally being 0.1 to 10, or 1.0 to 10.

Embodiment 11

A reformer comprising a reforming catalyst, the reforming catalyst comprising 0.1 wt % to 10.0 wt % of a Group VIII metal on a sulfur-tolerant support, the sulfur-tolerant support comprising bulk alumina and at least one of silica, titania, and zirconia.

Embodiment 12

The reformer of Embodiment 11, wherein the reformer comprises a reformer in a reverse flow reforming reactor.

Embodiment 13

The reformer of Embodiment 11, wherein the reformer comprises an on-board reformer in fluid communication with a spark ignition engine, the reformer optionally further comprising a reformer inlet in fluid communication with an engine exhaust and a reformer outlet in fluid communication with an engine fuel input.

Embodiment 14

The reformer of any of Embodiments 11 to 13, wherein the catalyst comprises a first catalytic metal and a second catalytic metal, the first catalytic metal comprising Rh, Ni, or a combination thereof, the second catalytic metal comprising Pt, Pd, or a combination thereof, a weight ratio of the first catalytic metal to the second catalytic metal optionally being 0.1 to 10, or 1.0 to 10.

Embodiment 15

The method of any of the above embodiments, wherein the Group VIII metal comprises Rh, Pd, Pt, or a combination thereof, the catalyst optionally further comprising a Group IB metal.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for reforming a hydrocarbon-containing stream, comprising:
    exposing a hydrocarbon-containing stream comprising 0.1 vppm or more of sulfur to a catalyst in the presence of at least one of $H_2O$ and $CO_2$ under reforming conditions to form a reformed product comprising $H_2$, and
    exposing the catalyst to a stream comprising 0.1 vol % or more of $O_2$ at a regeneration temperature for a regeneration time period,
    wherein the catalyst comprises 0.1 wt % to 10.0 wt % of a Group VIII metal on a sulfur-tolerant support comprising a mixture of alumina and silica, at least a portion of the alumina comprising bulk alumina.

2. The method of claim 1, wherein the exposing the catalyst to a stream comprising 0.1 vol % or more of $O_2$ is periodic at a regeneration temperature for a regeneration time period.

3. The method of claim 1, wherein the regeneration temperature comprises 200° C. to 700° C.

4. The method of claim 1, wherein the sulfur-tolerant support comprises 1.0 wt % to 80 wt % alumina.

5. The method of claim 1, wherein the sulfur-tolerant support further comprises alumina with octahedral coordination.

6. The method of claim 1, wherein the Group VIII metal comprises Rh, Pd, Pt, or a combination thereof.

7. The method of claim 1, wherein the catalyst further comprises a Group IB metal.

8. The method of claim 1, wherein the hydrocarbon-containing stream is exposed to the catalyst in a reverse flow reactor.

9. The method of claim 8, wherein the hydrocarbon-containing stream comprises 5 wt % or more $C_{2+}$ hydrocarbons, 40 wt % or more methane, or a combination thereof.

10. The method of claim 1, wherein the hydrocarbon-containing stream comprises a fuel for a spark ignition engine.

11. The method of claim 10, wherein the exposing the hydrocarbon-containing stream to the catalyst further comprises exposing a recycle portion of an exhaust gas from combustion of at least a portion of the reformed product to the catalyst.

12. The method of claim 1, wherein the hydrocarbon-containing stream comprises 0.1 vppm to 20 vppm of sulfur.

13. The method of claim 1, wherein the catalyst comprises a first catalytic metal and a second catalytic metal, the first catalytic metal comprising Rh, Ni, or a combination thereof, the second catalytic metal comprising Pt, Pd, or a combination thereof.

14. The method of claim 13, wherein a weight ratio of the first catalytic metal to the second catalytic metal is 0.1 to 10.

15. A reformer comprising a reforming catalyst, the reforming catalyst comprising 0.1 wt % to 10.0 wt % of a Group VIII metal on a sulfur-tolerant support, the sulfur-tolerant support comprising a mixture of alumina and silica, at least a portion of the alumina comprising bulk alumina.

16. The reformer of claim 15, wherein the reformer comprises a reformer in a reverse flow reforming reactor.

17. The reformer of claim 15, wherein the reformer comprises an on-board reformer in fluid communication with a spark ignition engine.

18. The reformer of claim 17, wherein the reformer comprises a reformer inlet in fluid communication with an engine exhaust and a reformer outlet in fluid communication with an engine fuel input.

19. The reformer of claim 15, wherein the catalyst comprises a first catalytic metal and a second catalytic metal, the first catalytic metal comprising Rh, Ni, or a combination thereof, the second catalytic metal comprising Pt, Pd, or a combination thereof.

20. The reformer of claim 19, wherein a weight ratio of the first catalytic metal to the second catalytic metal is 0.1 to 10.

* * * * *